(12) United States Patent
Pilon et al.

(10) Patent No.: US 10,214,444 B2
(45) Date of Patent: Feb. 26, 2019

(54) METHOD FOR TREATING A SURFACE AND DEVICE IMPLEMENTED

(71) Applicant: COMMISSARIAT À L'ÉNERGIE ATOMIQUE ET AUX ÉNERGIES ALTERNATIVES, Paris (FR)

(72) Inventors: Fabien Pilon, Chambray-les-Tours (FR); Philippe Belleville, Tours (FR); Sébastien Lambert, Saint-Epain (FR); Olivier Rondeau, Pont de Ruan (FR); Sandrine Thomas, Monts (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/895,258

(22) PCT Filed: Jun. 6, 2014

(86) PCT No.: PCT/EP2014/061856
§ 371 (c)(1),
(2) Date: Dec. 2, 2015

(87) PCT Pub. No.: WO2014/195472
PCT Pub. Date: Dec. 11, 2014

(65) Prior Publication Data
US 2016/0102012 A1  Apr. 14, 2016

(30) Foreign Application Priority Data

Jun. 7, 2013 (FR) .................................... 13 55290

(51) Int. Cl.
*C23F 1/16* (2006.01)
*C03C 15/02* (2006.01)
(Continued)

(52) U.S. Cl.
CPC .......... *C03C 15/02* (2013.01); *C03C 23/0075* (2013.01); *C09K 13/02* (2013.01);
(Continued)

(58) Field of Classification Search
CPC ........ C09K 13/02; C09K 13/04; C09K 13/08; C03C 15/02; C03C 15/00; C03C 23/0075; C23F 1/20; C23F 1/36; C23F 1/08
(Continued)

(56) References Cited

U.S. PATENT DOCUMENTS 5,169,408 A * 12/1992 Biggerstaff ....... H01L 21/67023
                                                       134/144
6,562,144 B2  5/2003 Chang
(Continued)

FOREIGN PATENT DOCUMENTS

| FR | 2933332 A1 | 1/2010 |
| JP | 58225532 A | 12/1983 |
| WO | 2009142704 A1 | 11/2009 |

OTHER PUBLICATIONS

"Care for Hard Surfaces", "Healthy Cleaning 101", Jan. 22, 2014, pp. 1-7, Publisher: http://www.healthycleaning101.org/car-for-hard-surfaces/.
(Continued)

*Primary Examiner* — Lan Vinh
(74) *Attorney, Agent, or Firm* — Pearne & Gordon LLP

(57) ABSTRACT

The present invention relates to a method for treating a surface of an object which comprises the steps consisting of bringing the surface to be treated in contact with a diffusion intermediate and then maintaining said surface to be treated in contact with said diffusion intermediate without any movement relatively to each other, said diffusion intermediate being impregnated with a corrosive solution prior to (Continued)

contacting or during said contacting. The present invention also relates to a device implemented during such a method.

12 Claims, 1 Drawing Sheet

(51) Int. Cl.
*C03C 23/00* (2006.01)
*C09K 13/04* (2006.01)
*C09K 13/08* (2006.01)
*C09K 13/02* (2006.01)
*C23F 1/08* (2006.01)
*C23F 1/20* (2006.01)
*C23F 1/36* (2006.01)

(52) U.S. Cl.
CPC .............. *C09K 13/04* (2013.01); *C09K 13/08* (2013.01); *C23F 1/08* (2013.01); *C23F 1/20* (2013.01); *C23F 1/36* (2013.01); *C23F 1/16* (2013.01)

(58) Field of Classification Search
USPC ................... 216/99, 102, 103, 104, 108, 97; 156/345.1, 345.19, 345.21, 345.23
See application file for complete search history.

(56) References Cited

U.S. PATENT DOCUMENTS

| 6,596,167 | B2* | 7/2003 | Ji | B01D 67/0011 |
| | | | | 210/500.23 |
| 6,649,077 | B2 | 11/2003 | Tsai et al. | |
| 8,231,797 | B2* | 7/2012 | Jousseaume | B81C 1/00476 |
| | | | | 216/56 |
| 8,420,277 | B2* | 4/2013 | Lee | C08J 5/22 |
| | | | | 429/492 |
| 2003/0236056 | A1* | 12/2003 | Boo | B24B 37/04 |
| | | | | 451/11 |
| 2006/0127758 | A1* | 6/2006 | Shishido | H01M 2/0222 |
| | | | | 429/176 |
| 2008/0118784 | A1* | 5/2008 | Hermanns | H01M 8/0273 |
| | | | | 429/483 |
| 2008/0241604 | A1* | 10/2008 | Moore | H01M 4/8605 |
| | | | | 429/424 |
| 2008/0296165 | A1* | 12/2008 | Kunisawa | C25D 17/12 |
| | | | | 205/136 |
| 2011/0079931 | A1 | 4/2011 | Miller et al. | |

OTHER PUBLICATIONS

Nagarah, J., et al., "Ultradeep fused silica glass etching with an HF-resistant photosensitive resist for optical imaging applications", "Journal of Micromechanics and Microengineering", Feb. 14, 2012, pp. 035011 (1-17), vol. 22, No. 3.

Neauport, J., et al., "Polishing-induced contamination of fused silica optics and laser induced damage density at 351 nm", "Optics Express", Dec. 12, 2005, pp. 10163-10171, vol. 13, No. 25.

Pilon, F., "Acidage et caracterisation de surface et sub-surface de la silice", "CEA/Le Ripault. Rapport des activits Scientifiques et Techniques", 2003-2005, pp. 80-81.

Pilon, F., "Acidage et caracterisation de surface et sub-surface de la silice", "CEA/Le Ripault. Rapport des activits Scientifiques et Techniques", 2003-2005, pp. 80-81 (description from p. 2 of specification).

Suratwala, T., et al., "HF-based etching processes for improving laser damage rsistance of fused silica optical surfaces", "J. Am. Ceram. Soc.", Oct. 14, 2010, pp. 416-428, vol. 94, No. 2.

* cited by examiner

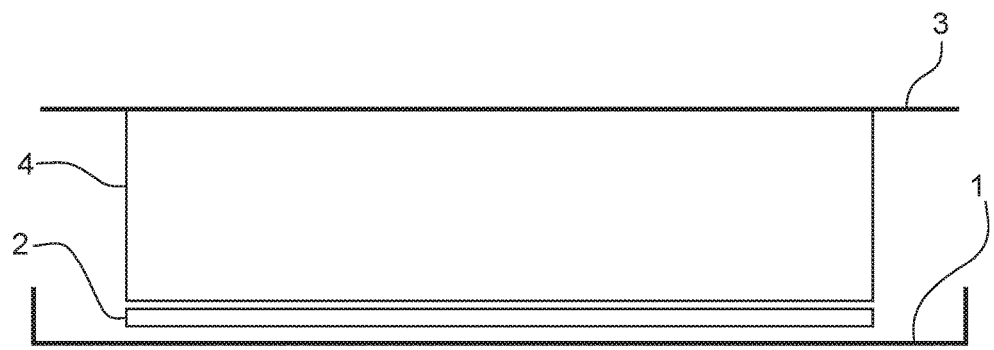

METHOD FOR TREATING A SURFACE AND DEVICE IMPLEMENTED

CROSS-REFERENCE TO RELATED APPLICATIONS

This application is a U.S. national phase under the provisions of 35 U.S.C. § 371 of International Patent Application No. PCT/EP14/61856 filed Jun. 6, 2014, which in turn claims priority of French Patent Application No. 1355290 filed Jun. 7, 2013. The disclosures of such international patent application and French priority patent application are hereby incorporated herein by reference in their respective entireties, for all purposes.

TECHNICAL FIELD

The present invention relates to the field of treatment of surfaces and more particularly, the field for treating surfaces using corrosive solutions.

Indeed, the present invention proposes a method and a device for corrosive treatment of surfaces such as glassy, ceramic or metal surfaces, said method and said device implementing a diffusion intermediate for applying the corrosive solution on the surface, without any relative movement of the surface to be treated relatively to the diffusion intermediate, once the $1^{st}$ has been brought into contact with the $2^{nd}$.

STATE OF THE PRIOR ART

The lifetime in the ultraviolet of optics in silica glass used in large installations using strong power lasers such as the megajoule laser (MJL) has been the subject of many studies. From these studies, it is now clearly established that the lifetime of optics in silica glass at 351 nm depends on the surface damages and their growth.

Today it is commonly recognized that obtaining polished surfaces compatible with a low density of damages lies in the limitation of the absorption sources induced by the polishing method at the interface, but also in the suppression of sub-surface damages introduced by the upstream polishing phases such as blank formation.

For this purpose, the treatment with acids or acid-etching has a benefit for improving the resistance to fluxes of the optics. This is why many studies have been conducted in order to study the polishing of parts with acids and notably in the field of optics (silica lenses).

In order to improve the resistance to a laser flux of optical components, a method was developed in 2005 in the article of Néauport et al [1], and then in 2007 in the article of Pilon [2]. The acid-etching method used consists of putting into contact for 10 min, the small size sample with a 90/10 (v/v) mixture of concentrated nitric acid ($HNO_3$) and of HF and then of rinsing the sample with de-ionized water, this procedure being repeated 8 times. As shown in FIG. 2 of [1] and in FIG. 1 of [2], the sample is positioned on 3 supports placed in a container, whereby the lower face of the sample is in contact by capillarity with the corrosive mixture, once the latter is directly poured into the container.

However, the propagation of the corrosive mixture by capillarity may cause differences in terms of the contact period between this mixture and the surface to be treated in fact causing a particularly pronounced and detrimental inhomogeneous acid etching for large size surfaces and very short contact times. Further, the use of supports generates at the surface to be treated, masked areas not subject to the acid-etching method.

U.S. Pat. No. 6,649,077 [3] proposes a method and an apparatus for removing coating layers at the surface of a semi-conducting wafer. This removal follows a particular pattern, i.e. a strip bordering the lower face of the plate (reference "508", FIG. 5).

Such a pattern is obtained by maintaining the plate suspended above a base by means of an inert gas flow and by having the corrosive solution flow on the upper face of the plate, when the latter is in rotation. More particularly, the width of the removed strip depends on the overlapping area between the plate and the border ring of the base since, in the generated space, the corrosive solution is brought by capillarity (column 5, lines 58-64).

The method described in [3] therefore requires the use of a waffle iron system and of an inert gas and therefore implies the setting into place of a hermetic system for injection. Further, it only relates to particular areas of small size parts.

An acid-etching method by capillarity is also described in international application WO 2009/142704 [4]. This application notably aims at providing a method using a lesser amount of corrosive solution.

For this purpose, the method proposed in [4] comprises the steps consisting of (i) providing a surface with at least one open channel, the latter defining the area of material to be removed and (ii) bringing by capillarity the corrosive solution via the channel as far as this area.

However it should be noted that even if the method described in [4] allows the use of less corrosive solution, it may require the use of a surfactant for increasing the wettability of the corrosive solution at the walls of the channels. Finally, the proposed method does not concern large treatment surfaces with a guarantee of homogeneity and is selective of certain areas.

Always relating to the treatment of silica optics in order to increase their resistance to damages caused by the lasers, patent application US 2011/0079931 [5] describes a treatment achieved by immersion in two successive baths of mineral acids, with ultrasonic or megasonic stirring and heating between 50° C. and 120° C. This treatment is directed to removing surface and subsurface defects present after polishing by achieving removal of material ranging from 100 nm to 10 µm.

The use of this method on polished silica glass surfaces is moreover described in the article of Suratwala et al, 2010 [6]. In this publication, the silica glass is immersed in different acid solutions based on HF and subject to different conditions such as for example different stirring frequencies or different rinsing conditions carried out by submerging silica glass in washing buffers.

The immersion method may also be used on smaller parts, like in U.S. Pat. No. 6,562,144 [7]. The method described in this patent comprises the steps consisting of (i) placing the semi-conductor wafer (i.e. the "wafer") in a closed chamber, (ii) placing in this chamber the washing solution so that the plate is completely immersed, (iii) lowering the pressure in the closed chamber to a value comprised between 0.1 and 0.9 atm before returning to a normal pressure value, the lowering of the pressure being a necessary condition for obtaining effective cleaning.

Industrially, the surface treatment of parts of large dimensions is carried out in tanks involving the use of a consequent volume of corrosive solution(s) under stirring. The latter is required in order to attempt to obtain an action of the etching mixture which is as homogenous and effective as possible. However, the methods using immersion in a corrosive solution have the disadvantages related to the handling and to the treatment of large volumes of corrosive solutions. Indeed, during each acid-etching treatment, the corrosive solution is contaminated by the removed elements from the surface to be treated in fact causing the requirement of regularly renewing such a corrosive solution. The immersion methods therefore, because of the required corrosive solution amounts for their application and then for their treatment, have a high cost, a non-negligible environmental impact and are incompatible with short acid treatment times.

Because of the benefit as regards an effective corrosive treatment method notably in the field of optics, there therefore exists a real need for a method and a device giving the possibility of treating both small dimension and large dimension surfaces, in association with the use of small volumes of corrosive solutions allowing limitation of the risks of crossed contaminations and of liquid or gas effluents. Such a method and such as device should further guarantee homogeneity of the erosion thickness and this, without any particular specific conditions such as a particular surrounding gas.

DISCUSSION OF THE INVENTION

The inventors attained the set goal and propose a method and a device for corrosive treatment of surfaces which do not have the drawbacks and disadvantages of the methods of the prior art.

The method according to the invention is compatible with highly variable corrosive agent concentrations and operating times. Indeed, the present invention provides a response to the problems discussed above, i.e. (i) the use of very small amounts of mineral acids, strong bases or mixtures thereof, which gives the possibility of renewal of the etching product and therefore of limiting the risks of cross contaminations and of reducing the amount of liquid or gas effluents; and (ii) the etching homogeneity, with control of the removed thickness which may range from 1 to several tens of microns and this, even on large surfaces.

For this, the principle of the method of the invention lies in the use of an intermediate for diffusing the corrosive solution allowing regular etching over the whole treated surface. This allows transfer by capillarity of the etching mixture as far as the part inhibiting any presence of bubbles and this, within a very short time, thus limiting the etching inhomogeneities due to variable contact times notably in the case of concentrated mixtures.

The treatment method of the invention is accomplished under static conditions and does not require any device for subjecting the corrosive solution to any stirring and to any particular condition, notably in terms of a particular gas environment. Static conditions are obviously understood once the surface of the object to be treated has been brought into contact with the diffusion intermediate i.e. during the contact. Thus, the method according to the present invention is distinguished from the methods of the prior art in which a diffusion intermediate impregnated with a corrosive solution is used for wiping the surface of the object to be treated and/or wherein the surface of the object to be treated moves or is moved on a diffusion intermediate impregnated with a corrosive solution.

Depending on the type of materials to be polished, different corrosive compositions may be used. Thus, in a remarkable way, the method and device of the invention not only relates to acid-etching of the surfaces and notably of the surfaces used in the field of optics but also any treatment of surfaces implying an acid or basic corrosive solution.

More particularly, the present invention relates to a method for treating a surface of an object, said method comprising a step consisting of putting the surface to be treated in contact with a diffusion intermediate impregnated with a corrosive solution.

As indicated earlier, the method is carried out under static conditions. Also, the present invention relates to a method for treating a surface of an object, said method comprising the steps consisting of bringing the surface to be treated in contact with a diffusion intermediate and then maintaining said surface to be treated in contact with said diffusion intermediate without any relative movement of one relatively to the other, said diffusion intermediate being impregnated with a corrosive solution beforehand upon maintaining it in contact or during said maintaining of contact.

By "method for treating", is meant within the scope of the present invention, a method giving the possibility of removing or chemically eroding a layer of material with a substantially constant thickness at the surface of the object to be treated put into contact with the corrosive solution.

The removed layer may not have any chemical or physical difference with the remainder of the object to be treated. In this case, the treatment method according to the present invention may be used for generating (micro-)structuration at the surface of the object to be treated.

Alternatively, the removed layer may be a layer having physical or chemical defects not present or less substantial in the remainder of the object. Such defects may notably be for example a passivation layer, a coating, (micro-)cracks, (micro-)crevices or irregularities of the roughness type at the surface. In this case, the treatment method according to the present invention may be used for removing, attenuating or reducing these defects. Such a treatment is particularly suitable for silica glass optics notably used in large installations using high power lasers.

Within the scope of the present invention, it is fundamental that the thickness of removed or eroded material is substantially constant over the whole treated surface. The method according to the present invention therefore corresponds to controlled removal of material i.e. a removal of a homogenous thickness and not affecting the properties of the treated object such as the optical and/or electrical properties.

Any object or any surface which may be subject to a treatment as defined earlier may be implemented within the scope of the present invention.

In the sense of the present invention, by "surface", is meant the outer portion of an object or solid body which limits it in any direction. It is possible, for a same object (or same solid body) to conceptually define different surfaces. The invention applies to any type of surface regardless of its geometry. The latter may be simple, like a perfectly planar surface or complex surface, like a rough surface, or have non-obstructed cavities and this regardless of the material making up the surface and the remainder of the object on which it depends.

Advantageously, within the scope of the present invention, the surface of the object to be treated may be an inorganic surface. More particularly, this surface may be a surface of a conductive material, a semi-conductive material and/or an insulating material.

From among the conductive materials advantageously implemented within the scope of the present invention, mention may be made of metals, noble metals, oxidized metals, transition metals, metal alloys and as particular and non-limiting examples, nickel, zinc, gold, platinum, titanium, steel, mixtures thereof and alloys thereof.

From among the semi-conducting materials advantageously implemented within the scope of the present invention, mention may be made, as particular and non-limiting examples, of silicon (Si), of silicon carbide (SiC), gallium arsenide (AsGa), gallium (Ga), indium phosphide (InP), mixtures thereof and alloys thereof.

From among the insulating materials advantageously implemented within the scope of the present invention, mention may be made of non-conductive oxides, amorphous insulating materials and crystalline insulating materials and as particular and non-limiting examples, silicon dioxide ($SiO_2$), aluminum oxide ($Al_2O_3$), magnesium oxide (MgO), a glass generally containing silicates, a silica glass, a ceramic or diamond, mixtures thereof and alloys thereof.

The object which one wishes to treat the surface of according to the method of the present invention may be optics notably silica glass optics such as those applied in large installations using high power lasers; an electrode or a wafer.

This object may have any size and shape. The particularity of the method according to the invention is that it may be used even on objects of large dimensions. For example, such an object may be optics, notably silica glass optics, for which the surface may attain 0.2 $m^2$ and the weight 25 kg.

The corrosive solution which may be applied within the scope of the present invention may be any solution known to one skilled in the art giving the possibility of treating a surface as discussed earlier. In other words, a corrosive solution which may be implemented within the scope of the present invention is a solution capable of dissolving a layer at the surface of the object to be treated with which it is put into contact.

This corrosive solution may be an acid or even strongly acid corrosive solution or an alkaline or even strongly alkaline corrosive solution.

By "strongly acid", is meant a corrosive solution for which the pH is less than or equal to 5, notably less than 4 and in particular less than 3. An acid corrosive solution comprises one or several mineral acids. As particular and non-exhaustive examples, an acid corrosive solution is notably selected from among hydrochloric acid (HCl), nitric acid ($HNO_3$), hydrofluoric acid (HF), sulfuric acid ($H_2SO_4$), phosphoric acid ($H_3PO_4$), ammonium fluoride ($NH_4F$), ammonium difluoride ($NH_4HF_2$), a notably aqueous HCl solution, a notably aqueous $HNO_3$ solution, a notably aqueous HF solution, a notably aqueous $H_2SO_4$ solution, a notably aqueous $H_3PO_4$ solution, a notably aqueous $NH_4F$ solution, a notably aqueous $NH_4HF_2$ solution and mixtures thereof. The acids or their mixtures used in the acid or even strongly acid corrosive solution may appear as concentrated acids.

Further, as particular examples of acid corrosive mixtures, mention may be made of (i) a (100-x/x) (vol/vol) mixture of optionally concentrated $HNO_3$ and of HF with x representing any integer comprised between 1 and 99, (ii) a 100-y/y (vol/vol) mixture of $HNO_3$ and of HCl with y representing any integer comprised between 1 and 99 or (iii) a 100-z/z (vol/vol) mixture of HF and of $NH_4F$ with z representing any integer comprised between 1 and 99.

By "strongly alkaline", is meant a solution for which the pH is greater than 9, notably greater than 10 and in particular greater than 11. The expression "strongly alkaline", is equivalent to and interchangeable with the expression "strongly basic". An alkaline or even strongly alkaline corrosive solution comprises one or several strong mineral bases. As particular and non-exhaustive examples, an alkaline or even strongly alkaline corrosive solution is notably selected from a notably aqueous solution of sodium hydroxide (NaOH), a notably aqueous solution of potassium hydroxide (KOH), a notably aqueous solution of calcium hydroxide ($Ca(OH)_2$), a notably aqueous solution of lithium hydroxide (LiOH), a notably aqueous solution of cesium hydroxide (CsOH), a solution of sodium hydride (NaH) in molten NaOH and mixtures thereof.

One skilled in the art is aware of different ways for preparing such corrosive solutions either by diluting or mixing existing commercial compositions, or by preparing them extemporaneously. One skilled in the art is also aware of different ways for adjusting the pH to the desired value, if necessary, notably by using additives giving the possibility of buffering the solution(s).

Further, one skilled in the art will be able to determine, without any inventive effort, the most suitable corrosive solution depending on the chemical nature of the surface to be treated.

As described earlier, the main feature of the method according to the present invention lies in the use of a diffusion intermediate. The latter is a solid support which has to be porous in order to allow good impregnation with the corrosive solution and which further has to be chemically inert towards this solution and during the treatment method according to the invention.

Advantageously, the diffusion intermediate is a porous solid support in a material selected from the group consisting of paper notably of a cellulose nature; cotton paper; agarose; gelatin; cellulose; methylcellulose; carboxymethylcellulose; nitrocellulose; cellulose acetate ester; an alginate; a polyolefin; a porous membrane and notably an ion exchange porous membrane; a resin of the sephadex type packaged as a membrane or a membrane of a perfluorinated polymer such as PVDF; a felt fabric; a glass fiber fabric; a membrane in an organic polymer such as polyethylene, polypropylene or mixtures thereof; a nylon fabric; a polyacrylamide gel; a sepharose gel and one of their mixtures.

One skilled in the art will be able to determine without any inventive effort, according to the applied corrosive solution, the most suitable material to be used for the diffusion intermediate.

It is advantageous if the diffusion intermediate has a selected morphology, and preferably adapted to the surface with which it will be put into contact. It may have a contact area with the surface to be treated substantially corresponding to this surface.

Alternatively, the diffusion intermediate may have a contact area with an original shape which may for example correspond to alphanumerical characters or idiograms. The contact area may be continuous or discontinuous. Thus the diffusion intermediate may have a contact area with the surface to be treated, discontinuous at variable scales and both centimetric, millimetric, micrometric and nanometric scales.

For this purpose, the diffusion intermediate may have been subject to a cutting step and this, before applying the method according to the invention. Advantageously, this cutting out is selected from cutting by selective chemical etching, physical cutting of the reactive ion etching type (or RIE), manual cutting such as embossing and cutting with a laser such as a pulsed laser with notably a source of the YAG type ("Yttrium Aluminum Garnet") or a continuous laser notably a $CO_2$ source laser. These lasers give the possibility of obtaining a resolution of the order of 5 to 10 μm.

It is also possible to obtain treated surfaces of a particular shape and notably discontinuous by other means. As examples, mention may be made of the application, before carrying out the method according to the invention, (i) of a mask on the surface to be treated or (ii) of a mask on and in the diffusion intermediate, said masks having to resist to the corrosive solution implemented during the treatment. Such a mask may notably appear as a photoresist resisting to the corrosive solution used during the treatment. As examples of such resins, mention may be made of the resin ProTEK PSA (Brewer Science, Inc. Rolla, Mo.) [8].

In a $1^{st}$ embodiment of the invention, the method comprises the successive steps consisting of:

$a'_1$) impregnating the diffusion intermediate notably as defined earlier with a corrosive solution notably as defined earlier;

$b'_1$) putting the obtained impregnated diffusion intermediate following step ($a'_1$) in contact with the surface of the object to be treated notably as defined earlier.

Thus, the method of this $1^{st}$ embodiment of the invention comprises the successive steps consisting of:

$a_1$) impregnating the diffusion intermediate notably as defined earlier with a corrosive solution notably as defined earlier;

$b_1$) bringing the surface of the object to be treated notably as defined earlier in contact with the obtained impregnated diffusion intermediate following step ($a_1$) and then maintaining said surface of the object to be treated in contact with said impregnated diffusion intermediate without any relative movement relatively to each other.

Any known technique for impregnating with a solution a porous support may be used within the scope of the present invention. However, taking into account the highly corrosive nature of the solution used, techniques using small amounts of solution will be favored.

As examples of impregnation procedures carrying our during step ($a_1$) or ($a'_1$) of the method according to the invention, mention may be made of an impregnation by depositing or applying the corrosive solution on the diffusion intermediate, by injecting the corrosive solution within the diffusion intermediate or by soaking the diffusion intermediate in the corrosive solution. The deposition, the application or the injection may be achieved in one point or in a single area of the diffusion intermediate or, on the contrary, in different points or different areas of this intermediate. This deposition, this application or this injection may apply one or several pipette(s), one or several syringe(s), one or several peristaltic pump(s) and/or soaking.

The impregnation is generally achieved until saturation of the diffusion intermediate, i.e. the latter is no longer able to absorb the corrosive solution. For this purpose, it may be necessary to carry out several times the impregnation step i.e. repeating the step ($a_1$) or ($a'_1$) in order to reach the saturation concentration in the diffusion intermediate.

Any known technique for applying (i.e. for bringing into contact a $1^{st}$ object (in the present case, the object to be treated) with another object (in the present case, the impregnated diffusion intermediate) may be used within the scope of step ($b_1$) or ($b'_1$) of the method of the present invention.

This application may be accomplished manually or be mechanically assisted notably by means of a pivoting-swinging system or by a vertical displacement system.

In a $2^{nd}$ embodiment of the invention, the method comprises the successive steps consisting of:

$a'_2$) putting the diffusion intermediate notably as defined earlier in contact with the surface of the object to be treated notably as defined earlier and then $b'_2$) impregnating the diffusion intermediate notably as defined earlier with a corrosive solution notably as defined earlier.

Thus, the method of this $2^{nd}$ embodiment of the invention comprises the successive steps consisting of:

$a_2$) bringing the surface of the object to be treated notably as defined earlier in contact with the diffusion intermediate notably as defined earlier and then maintaining said surface of the object to be treated in contact with said diffusion intermediate without any relative movement relatively to each other;

$b_2$) impregnating, during said contacting, the diffusion intermediate notably as defined earlier, with a corrosive solution notably as defined earlier.

This embodiment is distinguished from the previous one by impregnation with the corrosive solution involving once the diffusion intermediate and the surface to be treated have been put into contact with each other i.e. once the surface to be treated is brought into contact with the diffusion intermediate. The impregnation with the activation solution is therefore accomplished during the contacting of the surface to be treated with the diffusion intermediate.

All which has been described earlier for the steps ($a_1$)/($a'_1$) and ($b_1$)/($b'_1$) is applied mutatis mutandis to the steps ($b_2$)/($b'_2$) and ($a_2$)/($a'_2$) respectively. It should be noted that as regards the impregnation step ($b_2$) or ($b'_2$), the techniques and means give the possibility of obtaining rapid impregnation of the corrosive solution and uniform impregnation in the whole of the diffusion intermediate such that multipoint applications or injections will be favored.

Both in the $1^{st}$ and in the $2^{nd}$ embodiments, it is possible to apply pressure to the object so as to obtain a good contact between the surface to be treated and the diffusion intermediate and optionally remove the bubbles which may be found at the contact area. This pressure may both be manual and mechanical.

Both in the $1^{st}$ and in the $2^{nd}$ embodiments, the contact time between the surface to be treated and the diffusion intermediate impregnated with the corrosive solution may last between 1 min and 10 h, notably between 2 min and 5 h and, in particular, between 5 min and 1 h and for example of the order of 10 min (i.e. 10 min±3 min).

Once the steps ($a_1$)/($a'_1$) and ($b_1$)/($b'_1$) or the steps ($a_2$)/($a'_2$) and ($b_2$)/($b'_2$) have been carried out, the treated surface may be rinsed with a rinse solution adapted to the corrosion solution. Advantageously, such a rinse solution is water and notably de-ionized water.

Following this rinsing step, the steps ($a_1$)/($a'_1$) and ($b_1$)/($b'_1$) or the steps ($a_2$)/($a'_2$) and ($b_2$)/($b'_2$) may be repeated just like the subsequent rinsing step. During this repetition, the diffusion intermediate is advantageously replaced with a new diffusion intermediate of a nature identical with or different from the diffusion intermediate used earlier and impregnated with a corrosive solution either identical with or different from the corrosive solution used earlier. The replacement of the diffusion intermediate is a guarantee of treatment under optimum conditions without contamination of the latter and loss of effectiveness for the corrosive solution which it contains.

The treatment method according to the present invention may be carried out in a wide range of temperatures. However, it is generally carried out at room temperature of a laboratory or of a workshop, i.e. between 18 and 26° C.

The present invention also relates to a device which may be implemented within the scope of a method as defined earlier, said device schematized in the single FIGURE comprising:

(i') a fixed base (1) on which is deposited the diffusion intermediate (2) notably as defined earlier; and (ii') an element comprising a movable portion (3) on which is attached the object to be treated (4) and able to put the surface of said object to be treated in contact with said diffusion intermediate (2).

In other words, the present invention also relates to a device which may be implemented within the scope of a method as defined earlier, said device schematized in the single FIGURE comprising:

(i) a fixed base (1) on which is deposited the diffusion intermediate (2) notably as defined earlier; and (ii') an element comprising a movable portion (3) on which is attached the object to be treated (4) and able to bring the surface of said object to be treated in contact with said diffusion intermediate (2), said device not comprising any element able to displace said surface put into contact with said diffusion intermediate relatively to said diffusion intermediate.

In the device according to the present invention, the fixed base (1) is advantageously a container or a plate, the size of which is adapted so as to contain or support the diffusion intermediate. Such a fixed base is typically in an inert material in the presence of the corrosive solution such as Teflon or stainless steel.

In the device according to the present invention, the element comprising the movable portion (3) may be mechanically connected to the fixed base (2). Alternatively, the fixed base (2) may be deposited on the element comprising the movable portion (3). The movable portion (3) comprises means capable of maintaining or attaching the object (4), the surface of which is to be treated. Advantageously, these means are not positioned on the surface to be treated and are engaged on the other surfaces of the object.

Further, the element comprising the movable portion (3) has one or several means allowing the movable portion (3) to be displaced between a position away from the surface of the object to be treated and a position in physical contact with this surface. This or these means is (are) selected from the group consisting of a swinging axis, a pivot axis, a vertical guiding rail and a driving mechanism for vertically displacing the movable portion (3).

The device according to the present invention may further comprise (iii) means for (i.e. capable of or suitable for) impregnating the diffusion intermediate with the corrosive solution notably as defined earlier. These means, not shown in the single FIGURE, are advantageously selected from the group consisting of one or several pipette(s), one or several syringe(s), one or several peristaltic pump(s) and/or soaking means. These means may be in fluidic contact with a container containing the corrosive solution and this notably in the case of means as peristaltic pump(s).

Other features and advantages of the present invention will become further apparent to one skilled in the art upon reading the examples below given as an illustration and not as a limitation, with reference to the appended single FIGURE.

SHORT DESCRIPTION OF THE DRAWINGS

The single FIGURE is a schematization as seen from the side of a device according to the present invention.

DETAILED DISCUSSION OF PARTICULAR EMBODIMENTS

In each example, the device, the principle of which is described in the single FIGURE, is used.

Example 1

An optical silica part of 400 cm×400 cm×1 cm is put into contact with a mixture of nitric acid (80%) and of hydrofluoric acid (20%) via a fabric.

Example 2

A metal plate of 400 cm×400 cm×1 cm is put into contact with concentrated hydrochloric acid, via a fabric.

Example 3: Preparation of an Acid Corrosive Treatment Solution

In order to prepare the latter, in a vial, 80 ml of hydrofluoric acid concentrated to 40% (Prolabo—AnalaR NORMAPUR; reference 20307.290) and 20 ml of 65% concentrated nitric acid (Prolabo—AnalaR NORMAPUR; reference 20429.291) are mixed. This mixture is stirred manually for 15 s.

Example 4: Preparation of a Basic Corrosive Treatment Solution

In order to prepare the latter, in a vial, 20 g of soda (reference EMSURE ISO, tablets for analyses) and 30 ml of water of quality 3 according to the NF EN 3696 standard (resistivity 18.2 MΩ·cm at 25° C.) are mixed. This mixture is stirred manually for a few minutes until complete dissolution of the tablets. Because of the exothermy of this dissolution, the return to room temperature of the thereby obtained solution should be awaited.

Example 5: Demonstrating the Diffusion of an Acid Treatment Solution Through an Intermediate in Polypropylene In a retention system, three drops of about 0.05 cm$^3$ of acid solution, prepared according to example 3, are deposited according to the shape of a triangle and by spacing them apart from each other by about 3 cm. A polypropylene fabric sample (Pig Mat Haz Mat, Rip and Fit) is placed above these drops. A transparent silica part (diameter: 100 mm, density: 2.2) is then laid over this fabric.

After one hour of contact, the silica part is removed. And then the treated face is rinsed for 30 s by means of a squeeze bottle of water of quality 3 according to the NF EN 3696 standard (resistivity 18.2 MΩ·cm at 25° C.). Next, rinsing is performed by means of an absolute ethanol wash bottle for 30 s.

Subsequently to these operations, a misty zone appears above each drop on the silica part. The diffusion of an acid treatment solution through an intermediate of the polypropylene fabric type is thus demonstrated.

Example 6: Demonstrating the Diffusion of a Basic Treatment Solution Through a Polypropylene Intermediate In a retention system, two drops of about 0.05 cm$^3$ of basic solution, prepared according to example 4, are deposited by spacing them apart by about 2 cm. A polypropylene fabric sample (Pig Mat Haz Mat, Rip and Fit) is placed above these drops. And then an aluminum part (length: 30 mm, width 15 mm) is laid over this fabric.

After one hour of contact, the aluminum part is removed. And the treated face is then rinsed for 30 s by means of a wash bottle of water of quality 3 according to the NF EN 3696 standard (resistivity 18.2 MΩ·cm at 25° C.). Next, rinsing is performed by means of an absolute ethanol wash bottle for 30 s.

Subsequently to these operations, a misty zone appears above each drop on the aluminum part. The diffusion of a basic treatment solution through an intermediate of the polypropylene fabric type is thus demonstrated.

Example 7: Treatment of a Silica Surface on a Diffusion Intermediate Impregnated with an Acid Corrosive Treatment Solution The silica sample to be treated (diameter: 100 mm, density: 2.2) is weighed. And then a polypropylene fabric intermediate (Pig Mat Haz Mat, Rip and Fit) is cut out to the shape of the silica sample. This intermediate is impregnated with the acid corrosive solution prepared according to example 3. Next, the silica part is laid over the intermediate.

After one hour of contact, the silica part is removed. The treated face is then rinsed for 30 s by means of a wash bottle of water of quality 3 according to the NF EN 3696 standard (resistivity 18.2 MΩ·cm at 25° C.). Next, rinsing on this same face is performed by means of an absolute ethanol wash bottle for 30 s.

Weighing is then carried out. By comparing the latter to the initial weighing, an erosion of a thickness estimated to be 31 µm is obtained.

Example 8: Treatment of an Aluminum Surface on a Diffusion Intermediate Impregnated with an Acid Corrosive Treatment Solution First a roughness measurement is conducted on the sample in aluminum to be treated (length: 30 mm, width 15 mm). The piece of equipment used is a hand-held roughness tester TR200 from TIME Group Inc. The total height of the profile ($R_t$) of the relevant sample is of about 11 µm.

An intermediate in polypropylene fabric (Pig Mat Haz Mat, Rip and Fit) is cut out to the shape of the aluminum sample. Next, this intermediate is impregnated with the acid corrosive solution prepared according to example 3. Next, the aluminum part is laid over the intermediate.

At the end of the four hours of treatment, the aluminum part is removed. And the treated face is then rinsed for 30 s by means of a wash bottle of water of quality 3 according to the NF EN 3696 standard (resistivity 18.2 MΩ·cm at 25° C.). Next, rinsing is performed on this same face by means of an absolute ethanol wash bottle for 30 s.

The visual aspect of the sample is strongly modified and the latter is rougher to the touch. A roughness measurement is then conducted. It shows an elevation of the total height of the profile ($R_t$) between the aluminum surface before and after treatment, the latter attains a value of about 19 µm.

Example 9: Treatment of an Aluminum Surface on a Diffusion Intermediate Impregnated with a Basic Corrosive Treatment Solution First, a roughness measurement is conducted on the sample in aluminum to be treated (length: 30 mm, width 15 mm). The piece of equipment used is a hand-held roughness tester TR200 model from TIME Group Inc. The total height of the profile ($R_t$) of the relevant sample is of about 8 µm.

A polypropylene fabric intermediate (Pig Mat Haz Mat, Rip and Fit) is cut out to the shape of the aluminum sample. Next, this intermediate is impregnated with the basic corrosive solution prepared according to example 4. Next, the aluminum part is laid over the intermediate.

At the end of four hours of treatment, the aluminum part is removed. And the treated face is then rinsed for 30 s by means of a wash bottle of water of quality 3 according to the NF EN 3696 standard (resistivity 18.2 MΩ·cm at 25° C.). Next, rinsing is performed on this same face by means of an absolute ethanol wash bottle for 30 s.

The visual aspect of the sample is strongly modified and the latter is rougher to the touch. A roughness measurement is then conducted. It shows an elevation of the total height of the profile ($R_t$) between the aluminum surface before and after treatment, the latter attains a value of about 33 µm.

BIBLIOGRAPHIC REFERENCES

[1] Article of Néauport et al, 2005, "Polishing-induced contamination of fused silica optics and laser induced damage density at 351 nm", Optics Express, vol. 13, 10163.

[2] Article of Pilon, 2007, "Acidage et caractérisation de surface et sub-surface of the silice", CEA/Le Ripault. Rapport des activités Scientifiques et Techniques 2003-2005, page 80-81.

[3] U.S. Pat. No. 6,649,077 in the name of Taiwan Semiconductor Manufacturing Co. Ltd, published on Nov. 18, 2003.

[4] International application WO 2009/142704 in the name of Eastman Kodak Company, published on Nov. 26, 2009.

[5] Patent application US 2011/0079931 in the name of Lawrence Livermore National Security LLC, published on Apr. 7, 2011.

[6] Article of Suratwala et al, 2010, "HF-based etching processes for improving laser damage resistance of fused silica optical surfaces", J. Am. Ceram. Soc., DOI: 10.1111/j.1551-2916.2010.04112.

[7] U.S. Pat. No. 6,562,144 in the name of Macronix international Co., Ltd., published on May 13, 2003.

[8] Article of Nagarah and Wagenaar, 2012, "Ultradeep fused silica glass etching with an HF-resistant photosensitive resist for optical imaging applications". J. Micromech. Microeng., Vol. 22, 035011.

The invention claimed is:

1. A method for treating a surface of an object, said method consisting of:
    contacting the surface to be treated with a diffusion intermediate, said diffusion intermediate being impregnated with a corrosive solution prior to contacting or during said contacting, wherein said diffusion intermediate is a porous solid support that is chemically inert towards said corrosive solution; and
    maintaining said surface to be treated in contact with said diffusion intermediate without any movement relative to each other,
    wherein said treatment method removes or chemically erodes a layer of material from the surface of the object put into contact with the corrosive solution.

2. The method according to claim 1, wherein said surface is a surface in a metal, a noble metal, an oxidized metal, a transition metal or a metal alloy.

3. The method according to claim 1, wherein said surface is a surface in silicon (Si), in silicon carbide (SiC), in gallium arsenide (AsGa), in gallium (Ga), in indium phosphide (InP), in mixtures thereof or alloys thereof.

4. The method according to claim 1, wherein said surface is a surface in silicon dioxide ($SiO_2$), in aluminum oxide ($Al_2O_3$), in magnesium oxide (MgO), in glass, in silica glass, in ceramic, in diamond, in mixtures thereof or in alloys thereof.

5. The method according to claim 1, wherein said corrosive solution is an acid corrosive solution selected from among hydrochloric acid (HCl), nitric acid ($HNO_3$), hydrofluoric acid (HF), sulfuric acid ($H_2SO_4$), phosphoric acid ($H_3PO_4$), ammonium fluoride ($NH_4F$), ammonium difluoride ($NH_4HF_2$), an aqueous HCl solution, an aqueous $HNO_3$ solution, an aqueous HF solution, an aqueous $H_2SO_4$ solution, an aqueous $H_3PO_4$ solution, an aqueous $NH_4F$ solution, an aqueous $NH_4HF_2$ solution and mixtures thereof.

6. The method according to claim 1, wherein said corrosive solution is an alkaline corrosive solution selected from an aqueous solution of sodium hydroxide (NaOH), an aqueous solution of potassium hydroxide (KOH), an aqueous solution of calcium hydroxide ($Ca(OH)_2$), an aqueous solution of cesium hydroxide (CsOH), an aqueous solution of lithium hydroxide (LiOH), a solution of sodium hydride (NaH) in molten NaOH and mixtures thereof.

7. The method according to claim 1, wherein said diffusion intermediate is a porous solid support in a material selected from the group consisting of paper comprising cellulose; cotton paper; agarose; gelatin; cellulose; methylcellulose; carboxymethylcellulose; nitrocellulose; cellulose acetate ester; an alginate; a polyolefin; an ion exchange porous membrane; a sephadex resin packaged as a membrane; or a membrane of a perfluorinated polymer; a membrane in an organic polymer; a felt fabric; a glass fiber fabric; a nylon fabric; a polyacrylamide gel; a sepharose gel; and mixtures thereof.

8. The method according to claim 1, wherein said diffusion intermediate is impregnated with said corrosive solution prior to contacting the surface to be treated with said diffusion intermediate.

9. A method for treating a surface of an object, comprising:

bringing the surface of the object to be treated in contact with a diffusion intermediate;

impregnating, during said contacting, the diffusion intermediate with a corrosive solution, wherein said diffusion intermediate is a porous solid support that is chemically inert toward said corrosive solution; and maintaining said surface of the object to be treated in contact with said diffusion intermediate without any movement relative to each other, wherein said treatment method removes or chemically erodes a layer of material from the surface of the object put into contact with the corrosive solution.

10. A device comprising:
(i) a fixed base on which is deposited a diffusion intermediate; and
(ii) an element comprising a movable portion on which is attached an object to be treated and capable of bringing the surface of said object to be treated into contact with said diffusion intermediate, said device not comprising any element capable of displacing said surface put into contact with said diffusion intermediate relative to said diffusion intermediate, wherein said diffusion intermediate is impregnated by a corrosive solution which dissolves a layer at the surface of the object to be treated, and wherein said diffusion intermediate is a porous solid support that is chemically inert towards the corrosive solution.

11. The device according to claim 10, wherein said device further comprises an applicator capable of impregnating the diffusion intermediate with a corrosive solution.

12. The method according to claim 1, wherein treating the surface of the object removes or chemically erodes a layer of material with a substantially constant thickness at the surface of the object.

* * * * *